United States Patent
Martirosov (10) Patent No.: US 7,334,756 B2
(45) Date of Patent: Feb. 26, 2008

(54) GROUND-EFFECT CRAFT AND METHOD FOR THE CRUISING FLIGHT THEREOF

(76) Inventor: Rollan Gurgenovich Martirosov, ul. Mitinskaya, d. 52, kv. 452, Moscow (RU) 123627

( * ) Notice: Subject to any disclaimer, the term of this patent is extended or adjusted under 35 U.S.C. 154(b) by 353 days.

(21) Appl. No.: 10/512,640

(22) PCT Filed: May 30, 2003

(86) PCT No.: PCT/RU03/00247

§ 371 (c)(1),
(2), (4) Date: Oct. 27, 2004

(87) PCT Pub. No.: WO2004/009418

PCT Pub. Date: Jan. 29, 2004

(65) Prior Publication Data

US 2005/0183898 A1  Aug. 25, 2005

(30) Foreign Application Priority Data

Jul. 22, 2002 (RU) .............................. 2002119275
Jul. 22, 2002 (RU) .............................. 2002119276

(51) Int. Cl.
*B64C 29/00* (2006.01)
(52) U.S. Cl. ................... 244/23 R; 244/23 B; 244/105; 180/116
(58) Field of Classification Search ........ 244/105–106, 244/23 R, 23 B; 180/116
See application file for complete search history.

(56) References Cited

U.S. PATENT DOCUMENTS 3,275,270 A * 9/1966 Earl et al. ................. 244/110 E (Continued)

FOREIGN PATENT DOCUMENTS

GB  1296046  * 11/1972

(Continued)

*Primary Examiner*—J. Woodrow Eldred
(74) *Attorney, Agent, or Firm*—Jacobson Holman PLLC (57) ABSTRACT

The invention relates to flying vehicles. A centre wing is provided with aerodynamic profiles on the longitudinal sections thereof. A cigar-shaped fuselage is arranged on the central wing. A crew cabin and a cargo-passenger cabin are arranged inside the fuselage. Hollow hermetical longitudinal beams are mounted on the periphery of the central wing on the sides thereof. Inflatable shock-absorbing balloons are arranged under said longitudinal beams. Two keels provided with rudders are mounted on the ends of the longitudinal beams. A horizontal tail is arranged on the keels and comprises a diving rudder which is disposed on a section between the keels and ailerons which are disposed on the sections of the longitudinal beams. The thrust propeller for horizontal thrust is accommodated inside an external annular cowl. The engine for the thrust propeller is arranged inside the tail cone of the fuselage. A set of tale-off and landing devices comprises a means for producing a static air cushion. The cruising flight of the inventive ground-effect craft is carried out by the propeller thrust and a lifting force produced by the interaction of the central wing and a ram air and by the ground-effect of a ground or water surface. The height over ground or water surface must be equal to 0.1-0.5 of the mean chord of the central wing or to 0.2-0.9 of the span thereof when the angle of attack of the central wing is equal to 5-6°, the horizontal propeller thrust ranges from 0.25 to 0.33 of the flying weight of the craft and the speed is equal to 200-280 km/h.

7 Claims, 9 Drawing Sheets

U.S. PATENT DOCUMENTS

| | | | | |
|---|---|---|---|---|
| 4,068,606 A | * | 1/1978 | Van Veldhuizen | 114/67 A |
| 5,065,833 A | * | 11/1991 | Matsuoka et al. | 180/117 |
| 5,242,132 A | * | 9/1993 | Wukowitz | 244/106 |
| 5,415,365 A | * | 5/1995 | Ratliff | 244/101 |
| 5,566,775 A | * | 10/1996 | Schoell | 180/120 |
| 2002/0092949 A1 | * | 7/2002 | Nicolai | 244/106 |

FOREIGN PATENT DOCUMENTS

| | | | |
|---|---|---|---|
| RU | 2057040 | * | 3/1996 |
| RU | 9404419 | * | 2/1997 |
| RU | 2123443 | * | 12/1998 |
| RU | 2129501 | * | 4/1999 |
| RU | 2173644 | * | 9/2001 |
| RU | 2190557 | * | 10/2002 |
| SU | 1511170 | * | 9/1989 |

* cited by examiner

GROUND-EFFECT CRAFT AND METHOD FOR THE CRUISING FLIGHT THEREOF

This is a national phase of PCT/RU03/000247 filed May 30, 2003 and published in Russian.

TECHNICAL FIELD

The present invention relates to aircrafts—amphibians with an alighting gear, using an air cushion. A preferable field of application of the invention has been represented by passenger/freight ground-effect crafts, having a capacity, that amounts to 8 tons.

BACKGROUND OF THE INVENTION

By the Russian Patent No 2057040 and the Russian Patent No 2173644 there is provided a usage of developed center wing as a lifting surface area upon a propulsion with the help of air cushion. By means of the Russian Patent No 2057040 there is also provided with a considerable air part take-off from a flow, which is behind a propeller for an implementation of the air cushion under the center wing at an area, defined by means of retractable skirts. The air take-off for a creation of the static air cushion from the thrust propeller is provided by the Application No 94044419 for the Russian Patent. An accommodation of the propeller inside an external annular cowl and the air take-off before it for the air cushion implementation are provided by the USSR Certificate of Authorship No1511170.

DISCLOSURE OF THE INVENTION

A problem, to solving of which the present invention is directed, is an implementation of the ground-effect craft with high flight technical characteristics.

The center wing of the ground-effect craft is made with aerodynamic profiles on the longitudinal sections thereof. The center wing creates a lift during the cruising flight by means of interaction of the center wing and a ram air and by means of ground effect of a ground or water surface, but in regimes of take-off and landing it implements the lift by means of the static air cushion.

A cigar-shaped fuselage of the ground-effect craft with a crew cabin and cargo-passenger cabin is arranged on the center wing. Upon the cigar-shaped fuselage its aerodynamic drag is near to its minimal magnitude. The arrangement of the fuselage on the center wing makes easier an access of crew, passengers and maintenance staff to it.

Hollow hermetical longitudinal beams are mounted on the periphery of the center wing on its ends and are provided with inflatable shock-absorbing balloons on the bottom part of the beams. The longitudinal beams with the inflatable balloons during a flight regime time operate on the principle of boundary plates, improving a lift to drag ratio of the ground-effect craft by means of effective aspect-ratio of the center wing. In regimes of take-off from water and in regimes of water landing they are used as floats, and they fulfill a function of side skirt upon the movement by means of the static air cushion. The inflatable balloons also reduce dynamical loads during a landing.

Two keels with rudders of the ground-effect craft are mounted on the ends of the longitudinal beams. As a fins the rudders accomplish a lateral stabilization of the ground-effect craft.

A stabilizing fin of the ground-effect craft is mounted on the keels and is provided with an elevation rudder on the area between the keels, but on peripheral consoles it is provided with ailerons. A stabilizing fin of the ground-effect craft accomplishes a stabilization of the ground-effect craft with respect to a pitch.

A power plant of the ground-effect craft includes the thrust propeller for a creation of horizontal thrust and its engine, which is accommodated inside a tail cowl of the fuselage. The propeller envelopes the tail cowl of the fuselage and is contained in an annular external cowl. The engine accomplishes an actuation of the propeller in all the regimes of its operation. The propeller implements a horizontal thrust. The annular cowl forms an air flow behind the propeller and increases its efficiency.

A complex of take off and landing means of the ground-effect craft includes means for the static air cushion implementation, which provide with a keeping of gauge air pressure in a space under the center wing upon a take off and landing of the ground-effect craft, and maneuvering rudders, mounted on the ground-effect craft behind the propeller.

In most cases the best flight and technical characteristics may be obtained, when the center wing is made with:

an aspect ratio, that is within the range from 0.5 to 0.6;
a mean chord which ranges from 0.18 to 0.25 of its span;
an angle of mean chord twisting with respect to a rear edge, which is within the range from 3° to 5°;
an angle of end chord twisting with respect to a rear edge, that ranges from 1° to 2°;
a sweep of front edge, corresponding to its rounding in the horizontal surface radially from 0.7 to 0.9 of a span of the center wing;
a lateral dihedral angle V, that is within the range from −4° to −6° along the front edge;
a chord/thickness ratio along the axis of the center wing, which ranges from 9% to 10%, and at end chords it is within the range from 7% to 8%.

The best characteristics of the ground-effect craft operation are obtained, if the fuselage is made with two folding portions of canopy along one of sidewalls for entrance and exit of pilot and passengers as well as with two emergency hatches for an exit at another sidewall.

In order to prevent an undesirable interaction between the propeller and empennage there are the following optimal ratios of dimensions:

a span of the stabilizing fin is greater than a doubled span of the center wing of the ground-effect craft;
a distance between the stabilizing fin and the propeller is larger than four diameters of the propeller;
a span of the fins is more than two diameters of the propellers.

The best aerodynamic integration is obtained, if the longitudinal beams have a height, which is evenly decreasing from the middle portion to the nose portion and the tail portion.

In accordance with the present invention, cruising flight of the ground-effect craft is made by means of the thrust propeller thrust, by means of lift, caused by the interaction of the center wing with a ram air flow, and by means of the ground-effect of a water or ground surface at the velocity, that is within the range from 200 to 280 km/h, at the height from ground surface or water surface, that ranges from 0.1 to 0.5 of the mean chord of the center wing or that is within the range from 0.2 to 0.9 of its span, upon the incidence angle of the center wing, that is within the range from 5° to 6°, and upon the thrust of the thrust propeller, which ranges from 0.25 to 0.33 of flight weight of the ground-effect craft.

The ground-effect craft may be made with consoles of its wing. An area of the consoles is within the range from 0.4 to 0.6 of the ground-effect craft area, but a span is within the range from 2.5 to 3.0 of the span of the ground-effect craft. The consoles are fitted at a lateral dihedral angle in the range from 1° to 2°. A root portion of each console, connected to the longitudinal beam, is fitted at an angle, which ranges from 25° to 30°. A span of the root portion is within the range from 0.33 to 0.37 of the console span.

The presence of the consoles permits to operate the ground-effect craft as an aircraft upon a flight between regions, which are suitable for the usage of ground effect, for example, between sea, lake or river surface, and uninhabited ground surfaces.

The best characteristics of the ground-effect craft operation may be obtained, if the complex of take off and landing means of the ground-effect craft with the means for the static air cushion implementation includes:

front and rear flexible retractable skirts, positioned on the bottom surface of the front and rear portions of the ground-effect craft;

an air-duct for the air cushion supercharging, which is made in the ground-effect craft and is intended for a take-off a part of air flow behind the propeller and into the space under the ground-effect craft, which is defined by means of the front and rear flexible skirts;

a rotational flap, which is mounted behind the propeller and capable of being installed in a position of blocking the inlet of the air-duct for the air cushion supercharging or in a position at an angle to exterior surface of the center wing to form intake for a part of air flow behind the propeller;

rotational flaps, which are mounted and capable of being installed in a position blocking the inlet of the air-duct for the air cushion supercharging or in a position of opening an outlet of this air-duct on the bottom surface of the center wing;

a device for a synchronization of output and retraction of the flexible skirts with a rotation of the in front for said air-duct and in its outlet, which includes two electric drives or hydraulic drives that interact by means of rods and arms with said skirts and flaps;

maneuvering rudders, mounted on struts behind the external annular cowl of the propeller.

During the ground-effect craft take off and landing the front and rear flexible skirts on the bottom surface of the front and rear portions of the center wing are withdrawn into the operation position, thereby forming a space for the air cushion implementation. The rotational flap, positioned on the upper surface of the center wing behind the propeller, is moved into a position at an angle with respect to the upper surface of the ground-effect craft of the center wing to form intake for, approximately, one third of air flow, created by means of the propeller. A part of the propeller air flow is transported under the front portion of the center wing behind the front flexible skirt, and in the space of the static air cushion there is created a gauge pressure of up to 100 kgf/m2 by means of pumping the flow part taken away.

BRIEF DESCRIPTION OF THE DRAWINGS

Further the present invention is explained by means of concrete examples of its embodiment with references to the accompanying drawings, in which there are represented.

DESCRIPTION OF THE INVENTION EMBODIMENTS

A cigar-shaped fuselage 1 with a crew cabin and a cargo-passenger cabin 2 is arranged on a center wing 3 with a capability of easy access of crew, passengers and maintenance staff to it. The fuselage 1 is made with folding portions 17 and 18 of canopy along the left sidewall for an entrance and exit for passengers and a pilot as well as with two emergency hatches (not shown) for their exit along the right sidewall.

The center wing 3 is a carrying element, that creates a lift upon a cruising regime of flight by means of interaction with a ram air flow and by means of ground effect of proximity of the ground or water surface. Upon regimes of take off and landing the lift has been realized by means of static air cushion under the center wing. The center wing 3 is made with:

an aspect ratio, that is within the range from of 0.5 to 0.6;

an angle of axial chord twisting with respect to a rear edge, which ranges from 3° to 5°;

an angle of end chord twisting with respect to a rear edge, that is within the range from 1° to 2°;

a sweep of front edge 16, corresponding to its rounding in the horizontal surface radially from 0.7 to 0.9 of a span of the center wing 3;

a lateral dihedral angle that is within the range from −4° to −6° along the front edge;

a chord/thickness ratio along the axis of the center wing, which ranges from 9% to 10%, and at end chords it is within the range from 7% to 8%.

Hollow hermetical longitudinal beams 4 are mounted along end chords of the center wing 3 and are provided with inflatable shock-absorbing balloons 5 in their bottom part. Upon a take off from a water and upon a water landing they are used as floats. During the ground-effect craft movement on a static or dynamic air cushion they are of side skirt importance. Furthermore, the inflatable balloons 5 reduce dynamic loads during a landing regime. Upon a flight the longitudinal beams 4 with the inflatable balloons 5 operate on the principle of boundary plates, improving a lift to drag ratio of the ground-effect craft by means of effective aspect ratio of the center wing. A height of the longitudinal beams 4 is evenly decreasing from the middles portion to the nose and tail portions.

Keels 6 with rudders 7 are mounted on the ends 8 of the longitudinal beams 4. The keels 6 implement a stabilization of the ground-effect craft. A stabilizing fin 9 is installed on the keels 6 and is provided with an elevation rudder 10 on the area between the keels, but on peripheral consoles 11 there are ailerons 12 of the stabilizing fin. The stabilizing fin implements a stabilization of the ground-effect craft with respect to a pitch. A span of the stabilizing fin 9 is more than a span of the center wing 3. A distance between the stabilizing fin 9 and a propeller 14 is greater than its four diameters. A span of fins in the form of the keels is greater than two diameters of the propeller 14.

Figure 1:
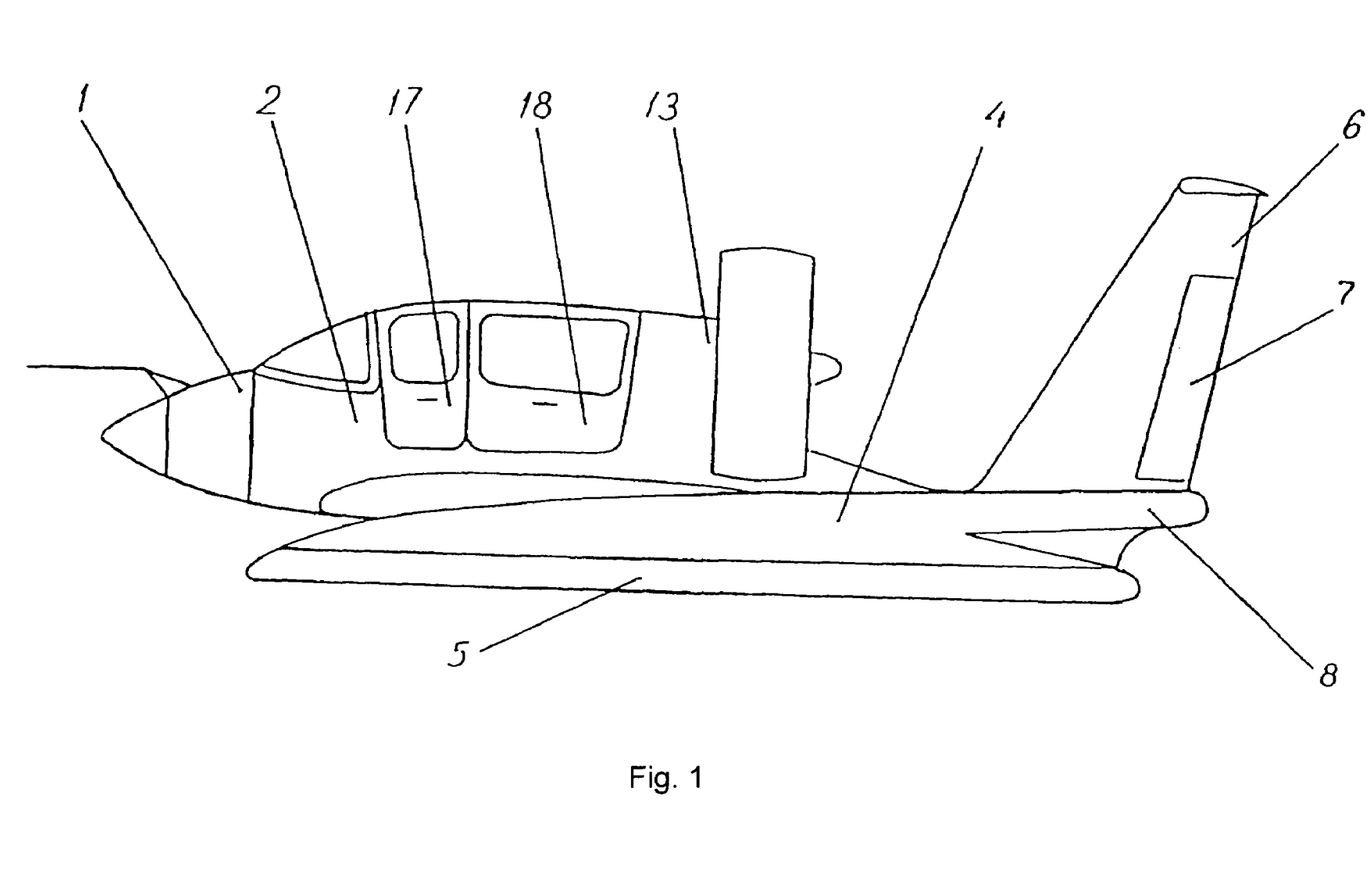
FIG. 1 is a side view of the ground-effect craft.
Figure 2:
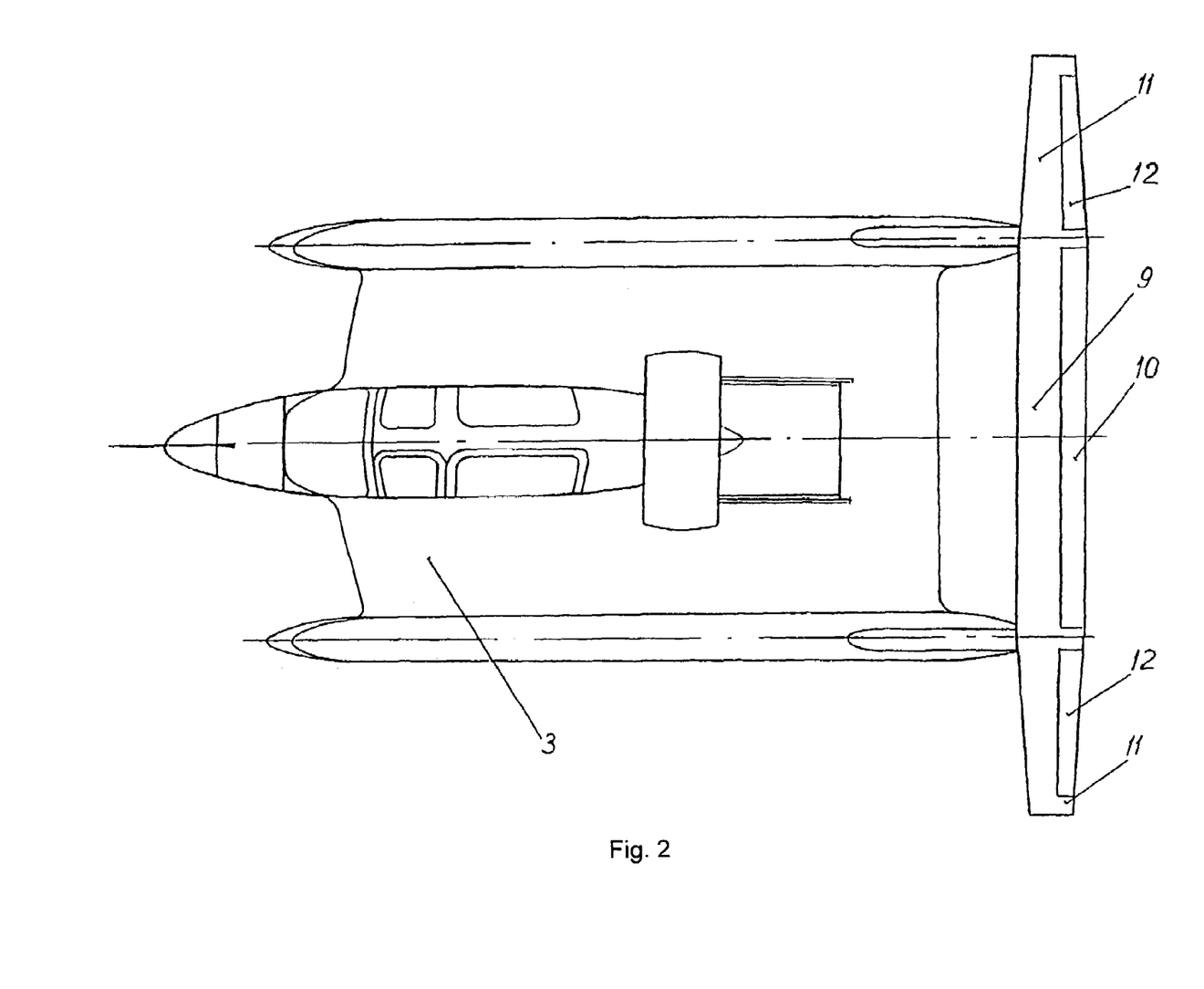
FIG. 2 is a view from the above on the ground-effect craft.
Figure 3:
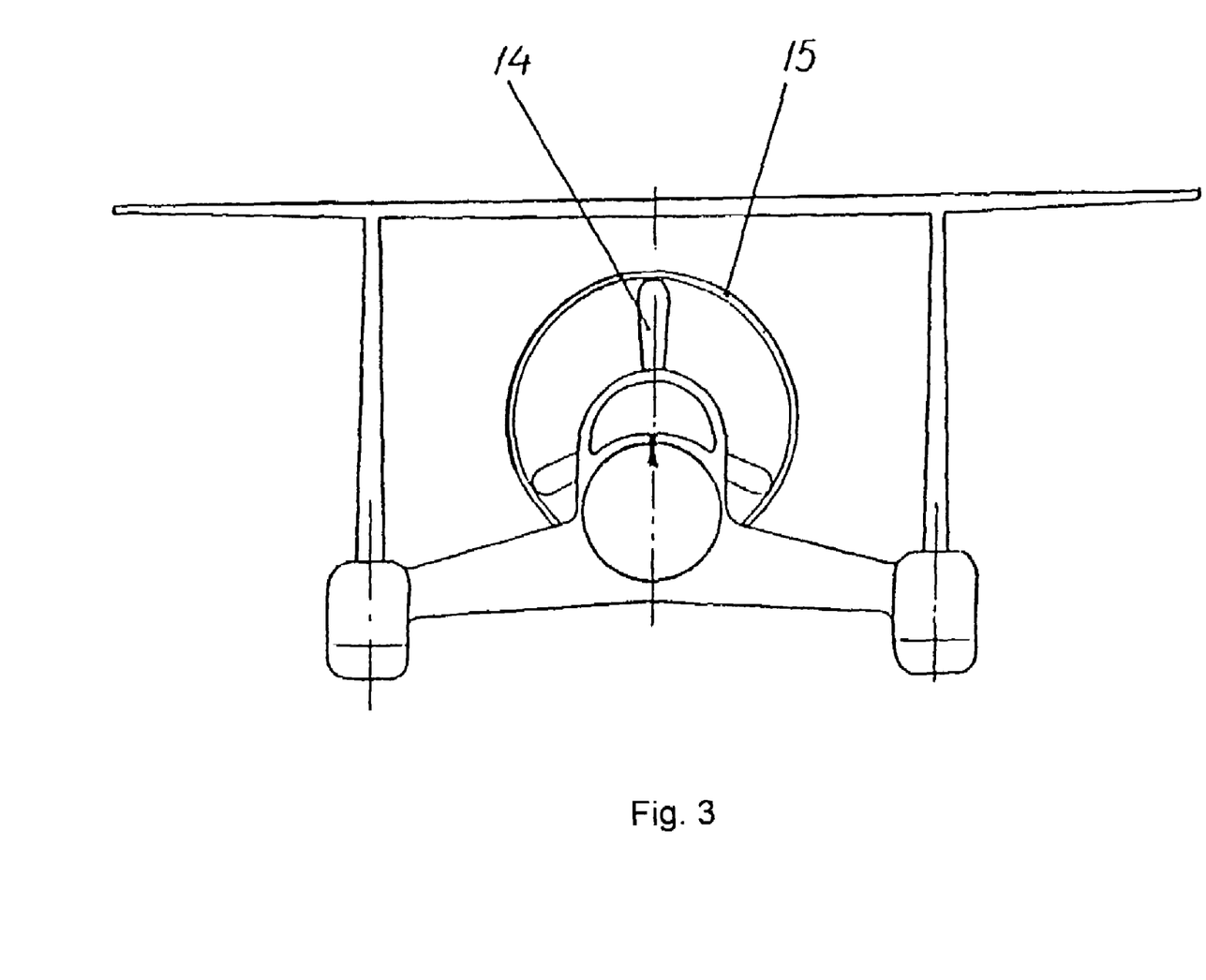
FIG. 3 is a front view of the ground-effect craft.
Figure 4:
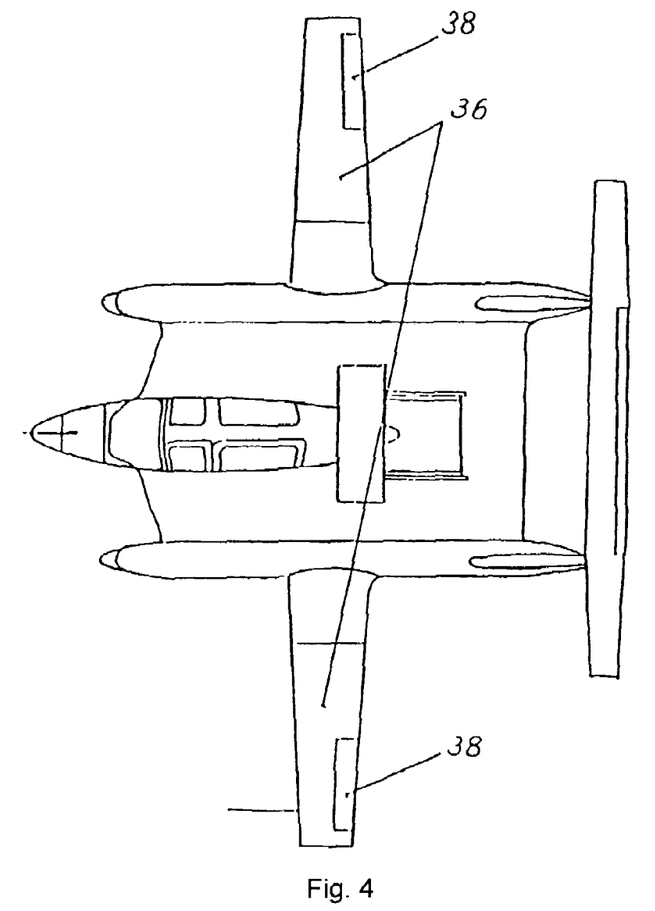
FIG. 4 is a view from the above on the ground-effect craft, which is modified and is provided with consoles of the wing.
Figure 5:
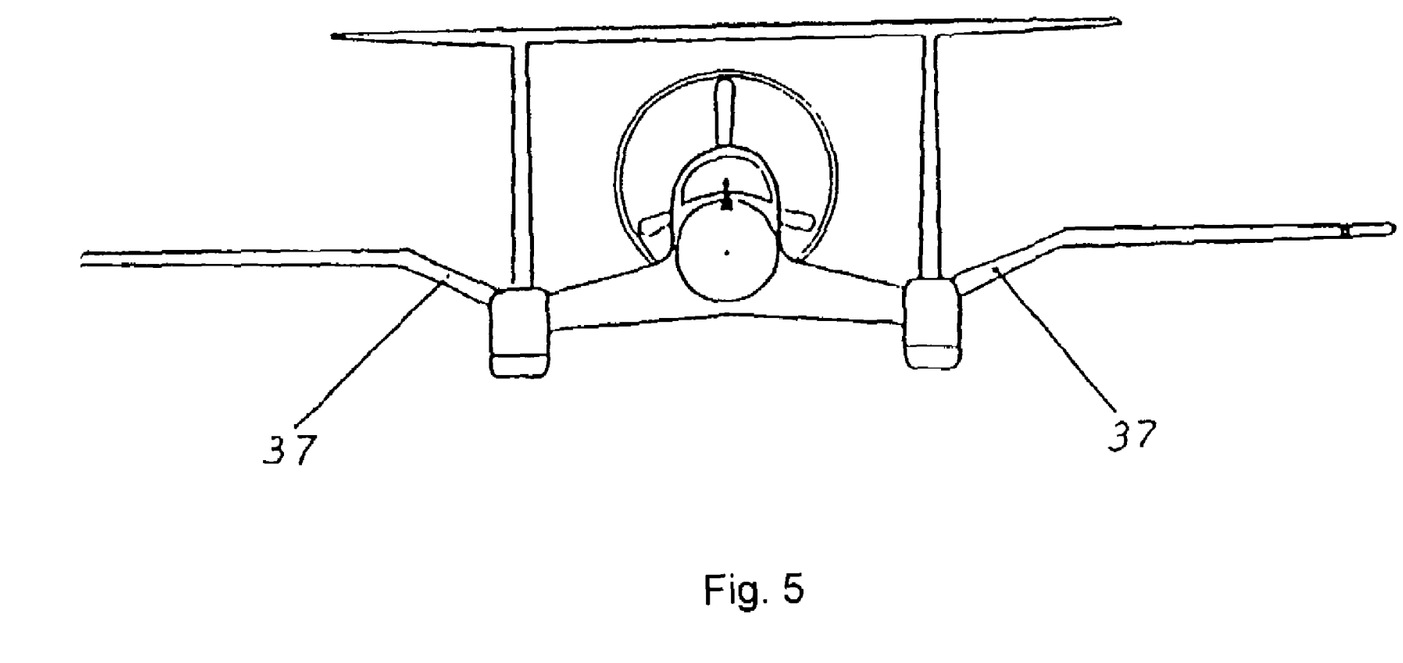
FIG. 5 is a front view of the ground-effect craft, which is modified and is provided with consoles of the wing.

In one of modifications the ground-effect craft is made with consoles 36 of the wing. An area of the consoles ranges from 0.4 to 0.6 of the area of the center wing 3. A span of the consoles is within the range from 2.5 to 3.0 of the span of the center wing 3. The consoles are installed at a lateral dihedral angle, which is in the range from 1° to 2°. A root portion 37 of each console, connected to the longitudinal beam 4, is fitted at an angle, which is within the range from 25° to 30°, and a span of the root portion is in the range from 0.33 to 0.37 of the console span. Each console 36 is provided with an aileron 38.

A power plant of the ground-effect craft includes a cruising engine (not shown), that is mounted inside of a tail cowl 13 of the fuselage, and the thrust propeller 14 for a horizontal thrust. The propeller 14 envelopes the tail cowl 13 of the fuselage and is contained in an annular external cowl 15. The engine accomplishes an actuation of the propeller 14 in all the regimes of its operation. The propeller 14 creates an air flow, providing with a horizontal thrust, but the annular cowl 15 forms an air flow behind the propeller 14 and improves its efficiency.

Figure 6:
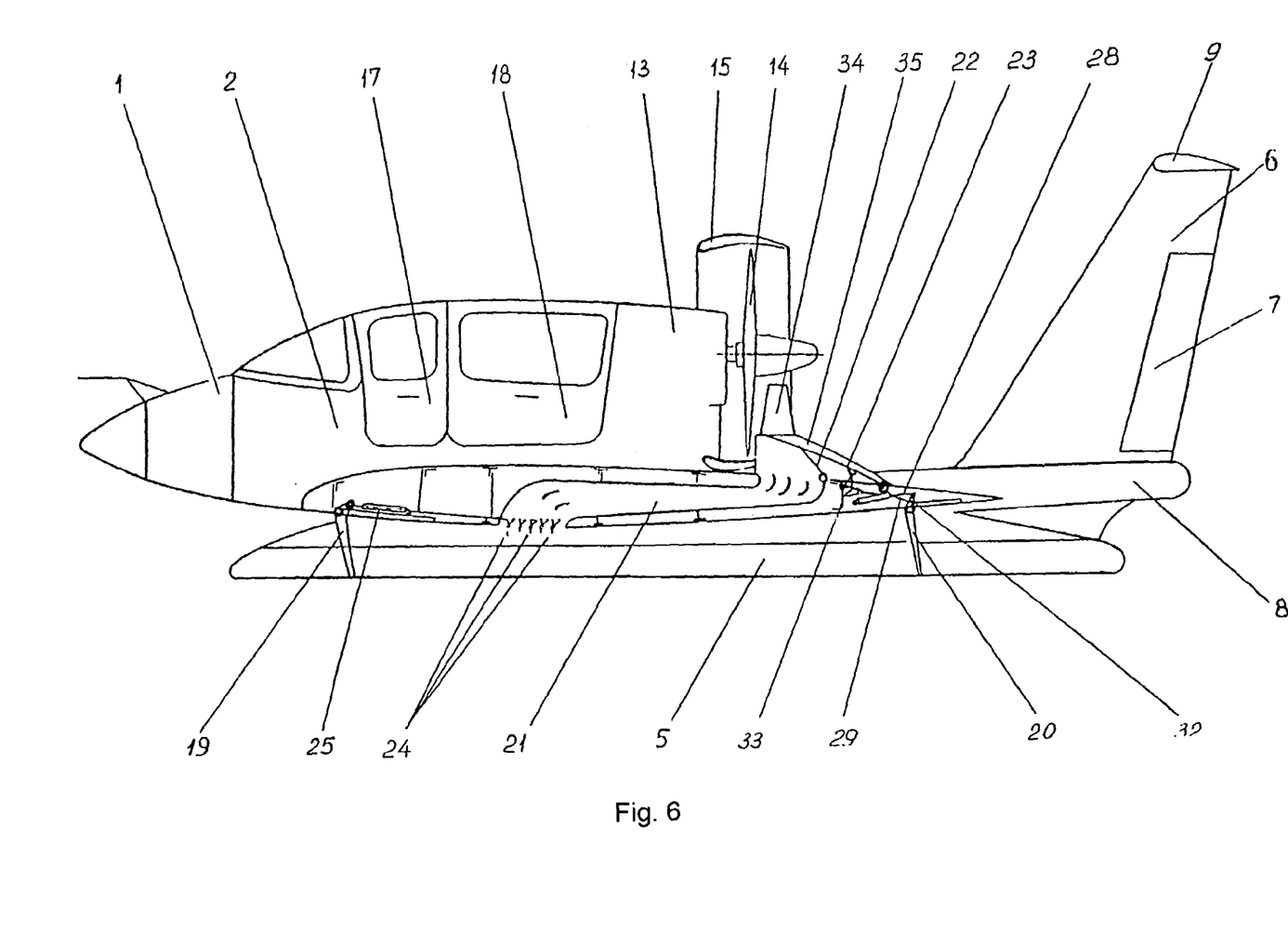
FIG. 6 is a cross-section of FIG. 1, taken on line A-A, showing the ground-effect craft in its position of take off or landing.
Figure 7:
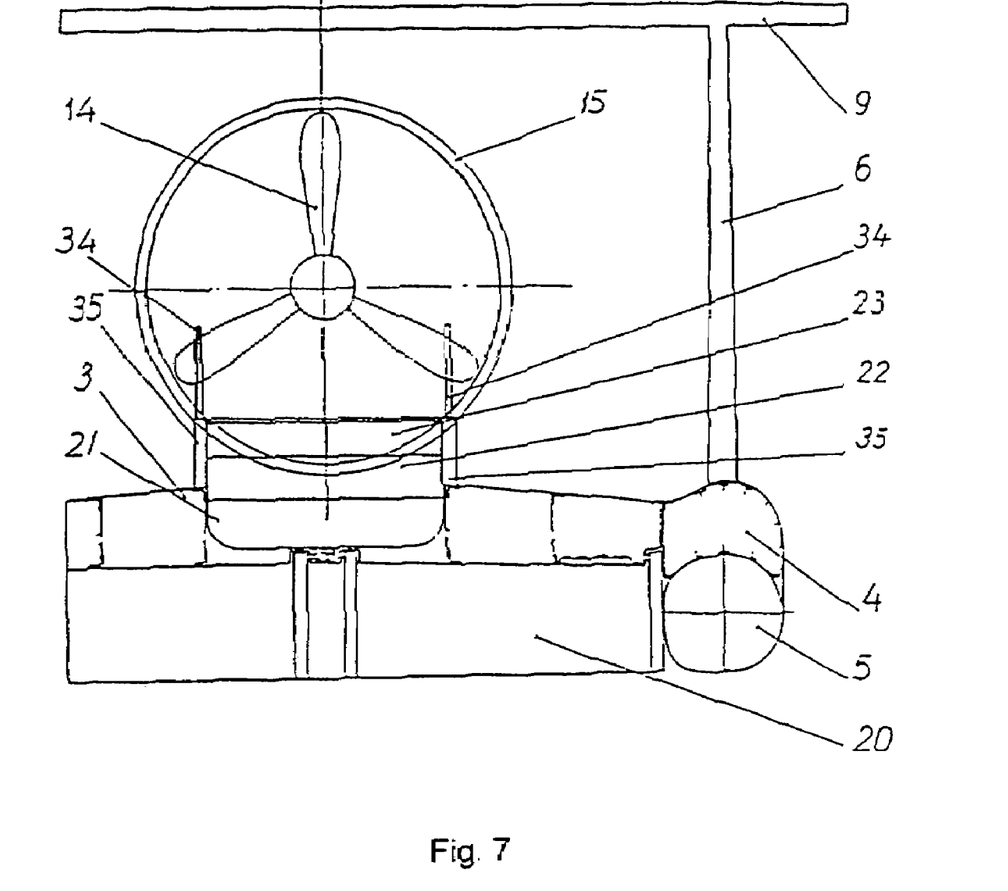
FIG. 7 is a view B of FIG. 6.

The center wing 3, the longitudinal beams 4 with the shock-absorbing balloons 5 and the propeller 14 are parts of means for making the static air cushion. A front flexible retractable skirt 19 and a rear flexible retractable skirt 20, which are respectively positioned on the rear surface of the front portion and the rear portion of the center 3, form jointly with the beams 4 and with the balloons 5 a space for the air cushion. An air-duct 21 for a supercharging of the air cushion is made in the center wing 3 and is intended for a take-off a part of the air flow behind the propeller 14 into the space, which has been defined by means of the front flexible skirt 19 and the rear flexible skirt 20. A rotational flap 22 is mounted behind the propeller 14 with a capability of its installation flash-mounted with the upper surface of the center wing 3 in a position of the air-duct 21 coverage or in a position at an angle with respect exterior with a forming intake, that has been formed by means of rotational panel 23 and inner side surfaces of a strut 35. The flap 22 may be spring-loaded in order to open the air-duct 21 or it may be connected to the panel 23 by means of slide-block mechanism. Rotational flaps 24 can be mounted in a position blocking the inlet of the air-duct 21 or in a position of opening the outlet of this air-duct. A device for a synchronization of output and retraction of the skirts 19 and 20 with a rotation of the flaps 21 and 24 includes electric drives or hydraulic drives 25, 26, which interact by means of rods 27, 28, a drawbar 29 and arms 30, 31, 32, 33 with said skirts, flaps 24 and flaps 21 by means of the panel 23.

Rudders 34 of complex of take off and landing means are mounted behind the propeller 14 on the struts 35, which are positioned above the rotational flap 22 and the panel 23 in a position of creation by them an intake for a part of the air flow behind the propeller, and these rudders are intended for a variation of movement direction of the ground-effect craft before its take off and after its landing.

Upon an operation of the ground-effect craft the shock-absorbing balloons 5 are inflated and in them the gauge air pressure, that equals to up 0.2 atmosphere, is kept up. During the ground-effect craft take off from a water or upon its water landing the front flexible skirt 19 and the rear flexible skirt 20 are taken out into the operation position, but the rotational flap 22 is moved by means of the panel into a position at an angle with respect to the center wing with a forming air intake. A part of the air flow, which is taken-off behind the propeller 14, is transported under the front portion of the center wing behind the front flexible skirt 19 and the static air cushion with a gauge air pressure of up to 100 kgf/m2 is created.

The variation of the movement direction of the ground-effect craft upon the regimes of the ground-effect craft take off and landing is accomplished by means of maneuvering rudders 34, interacting with the air flow, which is created by the propeller 14.

In cruising regime of flight there is created a lift of the dynamic air cushion by means of interaction between the center wing and a ram air flow and by means of ground effect of the proximity of ground or water surface. During a flight at the height from ground or water surface, which ranges from 0.1 to 0.5 of mean chord of the center wing or from 0.2 to 0.3 of its span at the velocity, that is within the range from 200 to 280 km/h, at the center wing incidence angle of from 5° to 6° and upon the horizontal thrust of the thrust propeller, which ranges from 0.25 to 0.33 of flight weight, there is created a sufficient lift.

Figure 8:
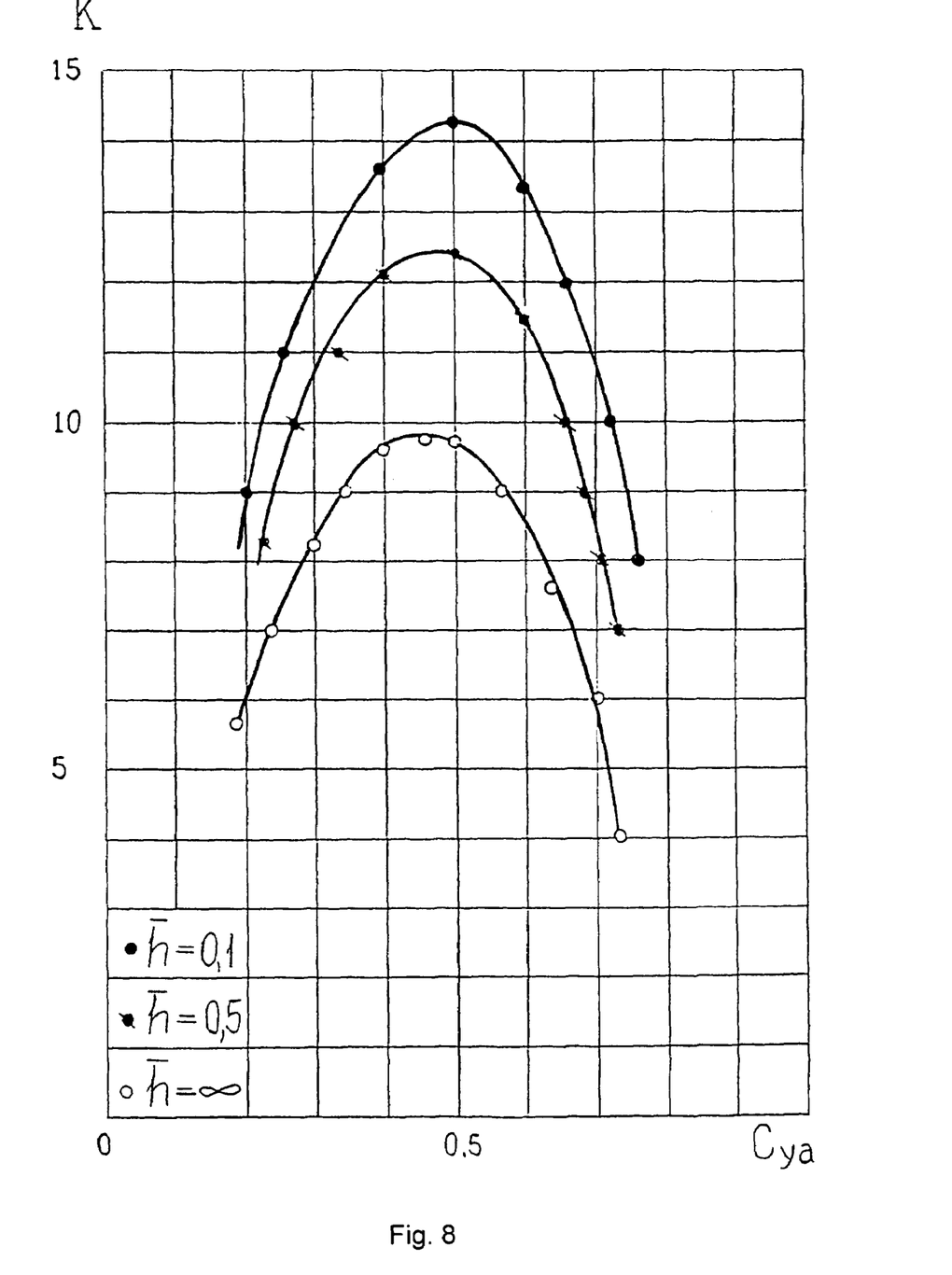
FIG. 8 is a graphic representation between the ground-effect craft lift to drag ratio and lift coefficient upon a flight at different heights.
Figure 9:
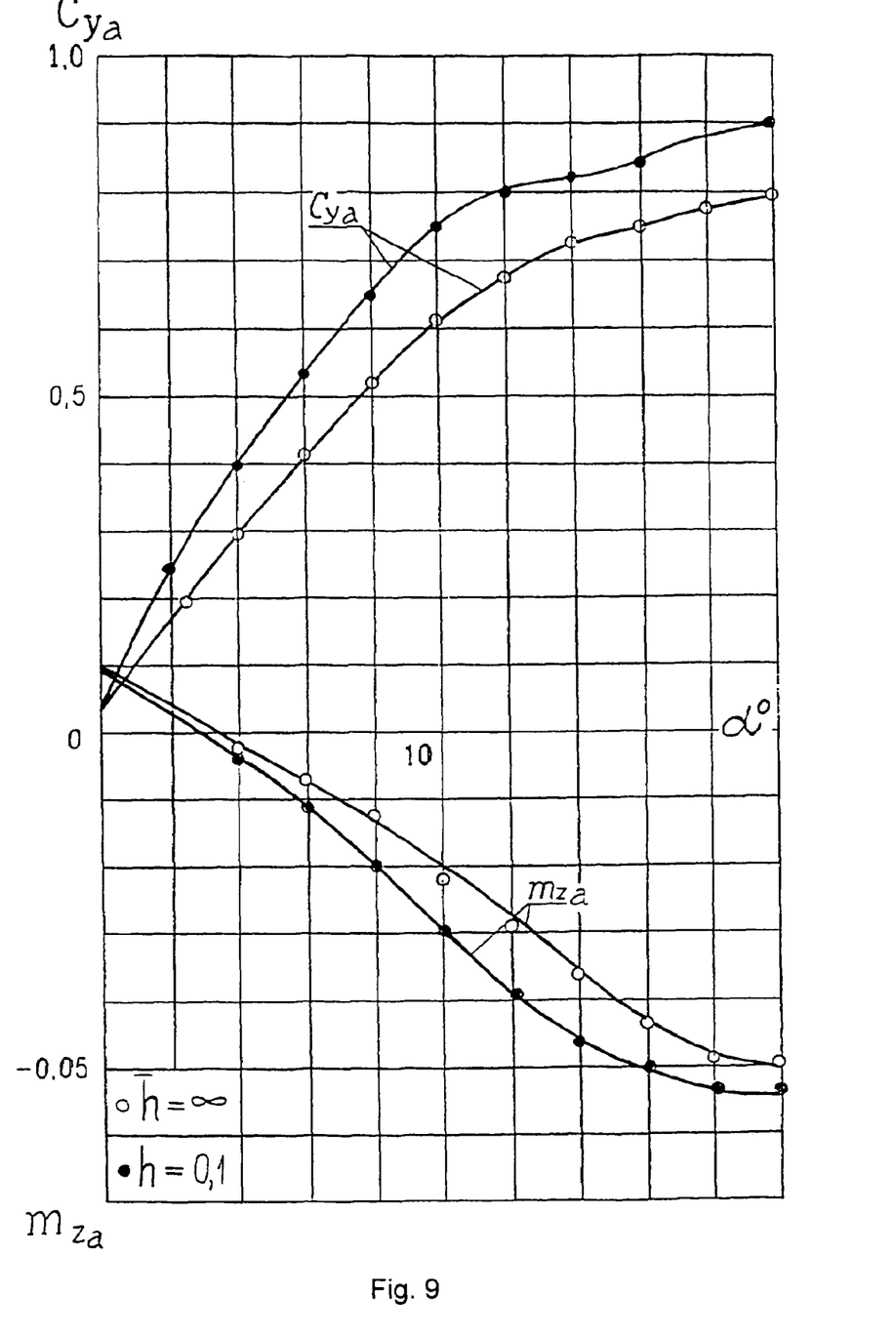
FIG. 9 is a graphic representation of the ground-effect craft aerodynamic lift coefficient and pitching moment coefficient dependence on an incidence angle upon a flight at different heights.

As it follows from plots, represented in FIGS. 8 and 9, during the flight at the height, corresponding to a ratio $\bar{h}$, i.e., a distance between the bottom surface of the center wing and ground or water surface, which is in the range of magnitudes, varying from 0.10 to 0.15, a maximum lift to drag ratio K may be attained upon a magnitude of aerodynamic lift coefficient Cya, corresponding to an incidence angle α of the center wing that ranges from 5° to 6°. From the plots it is seen, that other things being equal in a process of flight near a ground (at $\bar{h}$=0.1 . . . 0.5) the lift to drag ratio increases by from 2.5 to 4.5 of unit with respect to a lift to drag ratio of the flight at a great high. As a result, in a flight regime of ground effect there is realized a magnitude of lift to drag ratio of the order of 14, and it is very high magnitude for aircrafts with a dimensionality, that ranges from 2.0 to 2.5 tons of flight weight. From the plots of FIG. 8 it is seen, that as the ground-effect craft approaches to a ground surface, the magnitude of the aerodynamic lift coefficient, upon which there is obtained the maximum lift to drag ratio, increases from 0.45 upon the flight at a great height to 0.50 upon the relative magnitude $\bar{h}$=0.1. In FIG. 8 there are adduced dependences of the aerodynamic lift coefficient on an incidence angle variation upon the flight at a great height and upon the flight near a ground surface. There is a considerable increase of load-carrying capability of the ground-effect craft upon its flight near the ground surface (it increases by up to 30% at the incidence angle, that is within the range from 4° to 8°). A character of the dependence of pitching moment coefficient $mz_a$ on the incidence angle variation for different heights of flight shows, that ground-effect craft, when the incidence angle is within the range from 0° to 18°, is stable one, but at the incidence angles, which equal to 20° or which are more than this magnitude, the ground-effect craft is practically neutral one. Upon the flight with the incidence angle, that varies from 0° to 12°, a static maneuver margin is in the range from −0.06 to −0.09 without a dependence on the flight height.

Furthermore, the ground-effect craft with the consoles is capable to accomplish a free flight, preferably, for a movement from one region of ground effect flight to another region or for a movement to a region, that is suitable for take off and landing with a usage of the static air cushion.

INDUSTRIAL APPLICABILITY

In the adduced description of the invention there is mentioned a destination of its declared object. A capability of the invention embodiment by means of realization of the features, which characterize this invention and have been adduced in each of claims of the invention Patent Claims, follows from an implementation of similar features in various transport means including in objects of aeronautical engineering.

The invention claimed is:

1. Ground-effect craft, comprising:
    a center wing that is made with aerodynamic profiles on the longitudinal sections thereof;
    a cigar-shaped fuselage, that is mounted on the center wing;
    a crew cabin and cargo-passenger cabin, that are arranged on the center wing;
    hollow hermetical longitudinal beams, that are mounted on the periphery of the center wing along its sidewalls;
    inflatable shock-absorbing balloons, that are mounted under the longitudinal beams;
    two keels with rudders, that are mounted on the ends of the longitudinal beams;
    a stabilizing fin, that is mounted on the keels and includes an elevation rudder on the area between the keels, and on peripheral consoles it is provided with ailerons;
    a thrust propeller for a horizontal thrust, that is contained in an annular external cowl;
    an engine of the propeller, that is mounted inside a tail cowl of the fuselage; and
    a complex of taking off and landing means, including means for a static air cushion implementation;
    wherein the center wing is made with:
    an aspect ratio, that is within the range from 0.5 to 0.6;
    an angle of axial chord twisting with respect to a rear edge, which is within the range from of 3° to 5°;
    an angle of end chord twisting with respect to a rear edge that ranges from 1° to 2°;
    a sweep of front edge, corresponding to its rounding in the horizontal surface radially from 0.7 to 0.9 of a span of the center wing;
    a lateral dihedral angle V, that is within the range from −4° to −6° along the front edge;
    a chord/thickness ratio along the axis of the center wing, which ranges from 9% to 10%, and at end chords it is within the range from 7% to 8%.

2. Ground-effect craft as set forth in claim 1, wherein the means for a static air cushion implementation include:
    front and rear flexible retractable skirts, positioned on the bottom surface of the front and rear portions of the ground-effect craft;
    an air-duct for the air cushion supercharging, which is made in the ground-effect craft and is intended for a take off a part of air flow behind the propeller and into the space under the ground-effect craft, which is defined by front and rear flexible skirts;
    a rotational flap, which is mounted behind the propeller and capable of being installed in a position of blocking the inlet of air-duct for the air cushion supercharging or in a position at an angle to exterior surface of the center wing to form intake for a part of air flow behind the propeller;
    rotational flaps, which are mounted and capable of being installed in a position of blocking the air-duct for the air cushion supercharging or in a position of opening an outlet of this air-duct on the bottom surface of the center wing;
    a device for a synchronization of output and retraction of the flexible skirts with a rotation of the flaps in front of said air-duct and in its exit outlet.

3. Ground-effect craft as set forth in claim 2, wherein the device for a synchronization of output and retraction of the flexible skirts with a rotation of the flaps includes two electric drives or hydraulic drives, that interact by means of rods and arms with said skirts and flaps.

4. Ground-effect craft as set forth in claim 1, wherein:
    an area of the consoles ranges from 0.4 to 0.6 of the area of the center wing;
    a span of the consoles is within the range from 2.5 to 3.0 of the span of the center wing;
    the consoles are installed at a lateral dihedral angle V, which ranges from 1° to 2°;
    a root portion of each console, connected to the longitudinal beam, is fitted at an angle, which is within the range from 25° to 30°, and a span of the root portion is within the range from 0.33 to 0.37.

5. A method for cruising flight of a ground-effect craft, which is made by means of a thrust propeller thrust and by means of lift, caused by an interaction of a center wing with a ram air flow, and by means of the shield effect of a proximity of a water or ground surface at the height from the ground surface or water surface, that is within the range from 0.1 to 0.5 of the mean chord of the center wing or that ranges from 0.2 to 0.9 of its span, upon the incidence angle of the center wing, that is within the range from 5° to 6°, upon the thrust of the thrust propeller, which ranges from 0.25 to 0.33 of flight weight of the ground-effect craft and at the velocity, that is within the range from 200 to 280 km/h.

6. Ground-effect craft as set forth in claim 2, wherein:
    an area of the consoles ranges from 0.4 to 0.6 of the area of the center wing;
    a span of the consoles is within the range from 2.5 to 3.0 of the span of the center wing;
    the consoles are installed at a lateral dihedral angle V, which ranges from 1° to 2°;
    a root portion of each console, connected to the longitudinal beam, is fitted at an angle, which is within the range from 25° to 30°, and a span of the root portion is within the range from 0.33 to 0.37.

7. Ground-effect craft as set forth in claim 3, wherein:
    an area of the consoles ranges from 0.4 to 0.6 of the area of the center wing;
    a span of the consoles is within the range from 2.5 to 3.0 of the span of the center wing;
    the consoles are installed at a lateral dihedral angle V, which ranges from 1° to 2°;
    a root portion of each console, connected to the longitudinal beam, is fitted at an angle, which is within the range from 25° to 30°, and a span of the root portion is within the range from 0.33 to 0.37.

* * * * *